United States Patent [19]
Yamazaki et al.

[11] Patent Number: 6,041,291
[45] Date of Patent: Mar. 21, 2000

[54] DIGITAL DATA PROCESSING CIRCUIT AND DIGITAL DATA PROCESSING METHOD

[75] Inventors: Motohiro Yamazaki, Kawasaki; Shuichi Ando, Matsudo; Akira Toyama, Chigasaki, all of Japan

[73] Assignee: Nippon Precision Circuits, Inc., Tokyo, Japan

[21] Appl. No.: 09/118,249

[22] Filed: Jul. 17, 1998

[51] Int. Cl.[7] .................................................. G06F 17/10
[52] U.S. Cl. .............................................. 702/191; 702/190
[58] Field of Search ..................................... 702/190, 191; 340/310.03; 348/607, 608

[56] References Cited

U.S. PATENT DOCUMENTS 5,086,475  2/1992  Kutaragi et al. ........................ 381/36
5,212,659  5/1993  Scott et al. ........................... 364/724.1

Primary Examiner—Marc S. Hoff
Assistant Examiner—Craig Steven Miller
Attorney, Agent, or Firm—Amster, Rothstein & Ebenstein; Joel E. Lutzer

[57] ABSTRACT

A digital data processing circuit has an inverting circuit for inverting a positive/negative sign of the output data of an encoding circuit. A correcting circuit returns the inverted sign of the data to an original sign of data after decoding. Offset is made for truncation noises caused by the respective filtering operations in the encoding circuit and said decoding circuit. Sound quality is suppressed from degrading without increasing the circuit scale.

14 Claims, 5 Drawing Sheets

DIGITAL DATA PROCESSING CIRCUIT AND DIGITAL DATA PROCESSING METHOD

BACKGROUND OF THE INVENTION

This invention relates to a digital data processing circuit and processing method, and more particularly to an encoding/decoding circuit and method utilizing ADPCM (adaptive difference pulse code modulation) or the like.

Recently, there is a method of temporarily storing readout data through a filtering operation and compression and thereafter expanding the compressed data in order to ensure shock-proof during data reading using a CD player or the like. In such a technique, data trains are subjected to decoding and encoding through an ADPCM technique, using a digital data processing circuit, for example, shown in FIG. 5.

An encoding circuit 51 comprises adders A1, A2 and A3, registers C1 and C2, multipliers M1 and M2, and quantizer QN so that the latest input data is subjected to a filtering operation with a coefficient value of 1 multiplied by the latest input data and thereafter quantization. The inputted data Xi is subjected by the adder A1 to addition with a quantization noise Qri caused by the quantizer QN, and 1-sample data delay by the register C1. The data delayed by the register C1 is further delayed by 1-sample data by the register C2. Data outputted from the registers C1, C2 are multiplied by respective filter coefficients f1, f2 by the multipliers M1, M2, and these delay components are added to the data Xi by the adder A2, thus performing a FIR filtering operation. That is, the filtering operation with coefficient 1 by which the latest data is multiplied is realized by directly inputting the latest data to the adder A2 where it is added by delay components respectively multiplied by filter coefficients f1, f2, without multiplication by a particular coefficient. The adder A2 has output data quantized by the quantizer QN. For example, outputted data is one that is encoded through truncating an appropriate number of least significant bits. Meanwhile, the adder A3 subtracts the output data of adder A2 from the encoded data, thereby generating a quantization noise Qri.

A decoding circuit 52 is formed by an adder A4, registers C3, C4, and multipliers M3 and M4, to perform IIR filtering operation on the encoded data thereby providing decoded data. This is effected by the following operations. The output data of the adder A4 is delayed by 1-data sample by the register C3, and further delayed by 1-sample data by the register C4. The data outputs of the registers C3 and C4 are respectively multiplied by coefficients −f1, −f2, rendered negative of the filter coefficients f1, f2, by the multipliers M3, M4, and then added as recursive components to the encoded data.

In the above structure, however, the encoding circuit 51 and the decoding circuit 52 involve truncation noises for performing multiplication on data by the coefficients (f1, f2 or −f1, −f2). The filter coefficient has a decimal component, and accordingly the result of multiplication naturally contains a component smaller than a least significant bit represented on a data bus. Due to truncating such a component, a noise occurs. Assuming that the data Xi is configured by 16 bits having 1 code bit and 15 data bits, a calculation process is effected in 24 bits by adding with 6 decimal bits and 2 sign bits. Meanwhile, it is assumed that the coefficients f1, f2 are values represented by 6 decimal bits. To represent a value of 24-bit data multiplied by the coefficient f1, f2 requires 30 bits. However, since the processing is effected by 24 bits, truncation is made on least significant 6 bits of the decimal bits. In FIG. 5, the respective truncation noises caused by the multipliers in the encoding circuit and the decoding circuit are represented by Qmi and Qdi.

That is, in a encoding/decoding apparatus with ADPCM or the like, the most prominent noise component responsible for degradation in sound quality is round-off noise (quantization noise) Qri caused by the quantizer in FIG. 5. Besides this round-off noise, there exists truncation noise caused by the multiplier used for the above-stated filtering operation. In particular, where input data is small and the encode circuit has a small filtering operation output, the truncation noise is a principal factor of worsening sound quality.

Incidentally, although truncation noise as stated above can be decreased by increasing the number of bits for arithmetic operation, such measure results in increase of circuit scale.

SUMMARY OF THE INVENTION

It is an object of the present invention to provide a digital data processing circuit and processing method, which is capable of offsetting truncation noises caused by respective filtering operations during encoding and decoding, thereby suppressing sound quality from degrading without increasing the circuit scale.

In a digital data processing circuit, having an encoding circuit for performing, on a train of input data, filtering operation with a coefficient value of 1 by which the latest input data is multiplied and then quantization processing, to add a quantization noise caused by the quantization process to the input data thereby encoding and outputting the data train, and a decoding circuit for performing, on output data of the encoding circuit, filtering operation for decoding, the digital data processing circuit comprising: an inverting means for inverting a positive/negative sign of the output data of the encoding circuit; and a correcting means for returning the inverted sign of the data to an original sign of data after the decoding; whereby truncation noises caused by the respective filtering operations in the encoding circuit and the decoding circuit are offset.

Also, preferably, a digital data processing circuit, comprises: an encoding circuit for performing, on a train of input data, FIR filtering operation with a coefficient value of 1 by which the latest input data is multiplied to add a quantization noise caused by the quantization process to the input data to cause delays so that the filter operation is made using the delayed data and the latest input data and then the quantization process is made, thereby encoding the input data train and outputting an encoded data train; and a decoding circuit for performing IIR filter operation corresponding to the FIR operation for decoding the encoded data; the decoding circuit having an input of output data of the encoding circuit multiplied by −1 and an output of data after filtering operation multiplied by −1; the encoding circuit having a positive filter coefficient; and the decoding circuit having a recursive component added to the input data and equivalent to one obtained by a negative filter coefficient.

Also, preferably, a digital data processing circuit, comprises: an encoding circuit for performing, on a train of input data, FIR filtering operation with a coefficient value of −1 by which the latest input data is multiplied to add a quantization noise caused by the quantization processing to the input data to cause delays so that the filter operation is made using delayed data and the latest input data and then the quantization process is made, thereby encoding the input data train and outputting an encoded data train; a decoding circuit for performing IIR filter operation corresponding to the FIR operation for decoding the encoded data; a multiplying circuit for multiplying output data of the encoding circuit by −1; a multiplying circuit for multiplying the latest input data used in the filtering operation in the encoding circuit; a delay component added to the latest data multiplied by −1 being equivalent to one obtained by using a negative filter coefficient; the decoding circuit having an input of output data of the encoding circuit multiplied by −1; and each filter coefficient being a negative value.

Also, preferably, in a digital data processing method, having an encoding process for performing, on a train of input data, filtering operation with a coefficient value of 1 by which the latest input data is multiplied and then quantization processing, to add a quantization noise caused by the quantization processing to the input data thereby encoding and outputting the data train, and a decoding process for performing, on output data subjected to the encoding process, filtering operation for decoding, the digital data processing method comprising the steps of: an inverting process for inverting a positive/negative sign of the output data encoded; and a correcting process for returning the inverted sign of the data to an original sign of data after the decoding process; whereby truncation noises caused by the respective filtering operations in the encoding process and the decoding process are offset.

Also, preferably, in a digital data processing circuit, having an encoding circuit for performing, on a train of input data, filtering operation with a coefficient value of 1 by which the latest input data is multiplied and then quantization processing, to add a quantization noise caused by the quantization processing to the input data thereby encoding and outputting the data train, and a decoding circuit for performing, on output data of the encoding circuit, filtering operation for decoding, the digital data processing circuit comprising: the encoding circuit for generating the output data containing positive/negative-inverted one of a truncation noise occurring during coefficient multiplication when obtaining a delay component used for the filtering operation together with the latest input data so that the truncated noises in the filtering operations in the encoding circuit and the decoding circuit are reverse to each other and offset after decoding.

Also, preferably, a digital data processing circuit, comprises: an encoding circuit for performing, on a train of input data, FIR filtering operation with a coefficient value of −1 by which the latest input data is multiplied to add a quantization noise caused by the quantization processing to the input data to cause delays in order so that the filter operation is made using delayed data and the latest input data and then the quantization process is made, thereby encoding the input data train and outputting an encoded data train; a decoding circuit for performing IIR filter operation corresponding to the FIR operation for decoding the encoded data; the encoding circuit performing a multiplication process using a negative filter coefficient and filter operation to subtract a delay component obtained by truncating unwanted bits from the latest input data; the decoding circuit being inputted by an output of the encoding circuit and outputting the data after filtering operation, and using a recursive component added to the input data being equivalent to one obtained by using a negative filter coefficient.

Also, preferably, in a digital data processing process, having an encoding process for performing, on a train of input data, filtering operation with a coefficient value of 1 by which latest input data is multiplied and then quantization processing, to add a quantization noise caused by the quantization processing to the input data thereby encoding and outputting the data train, and a decoding process for performing, on the output data of the encoding circuit, filtering operation for decoding, the digital data processing process comprising the steps of: the encoding process for generating the output data containing positive/negative-inverted one of a truncation noise occurring during coefficient multiplication when obtaining a delay component used for the filtering operation together with the latest input data so that the truncated noises in the filtering operations in the encoding process and the decoding process are reverse to each other and offset after decoding.

DETAILED DESCRIPTION OF THE INVENTION

Now a digital data processing circuit according to a first embodiment of the present invention will be explained with reference to the drawings.

Figure 1:
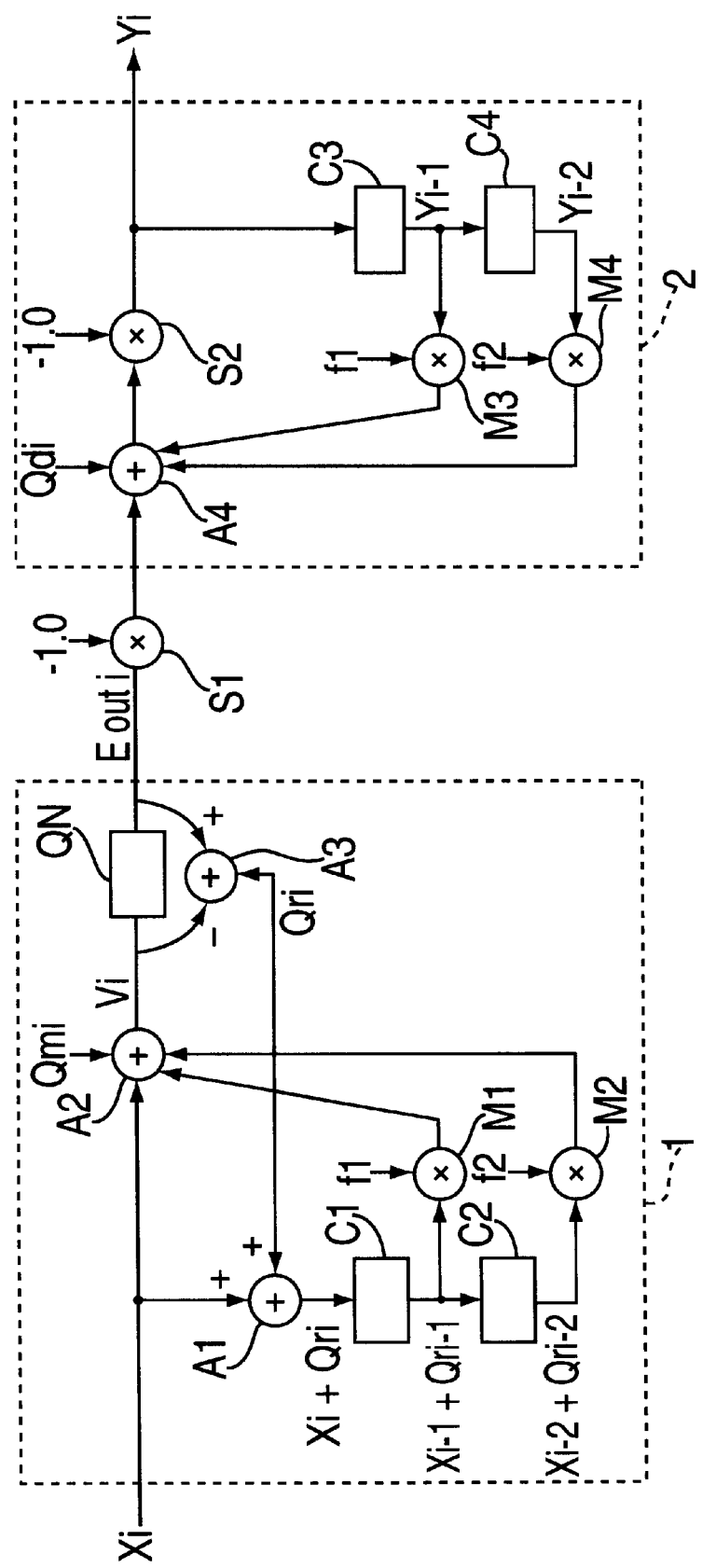
FIG. 1 is an explanatory view showing a structure of a digital data processing circuit according to a first embodiment of the present invention.
Figure 5:
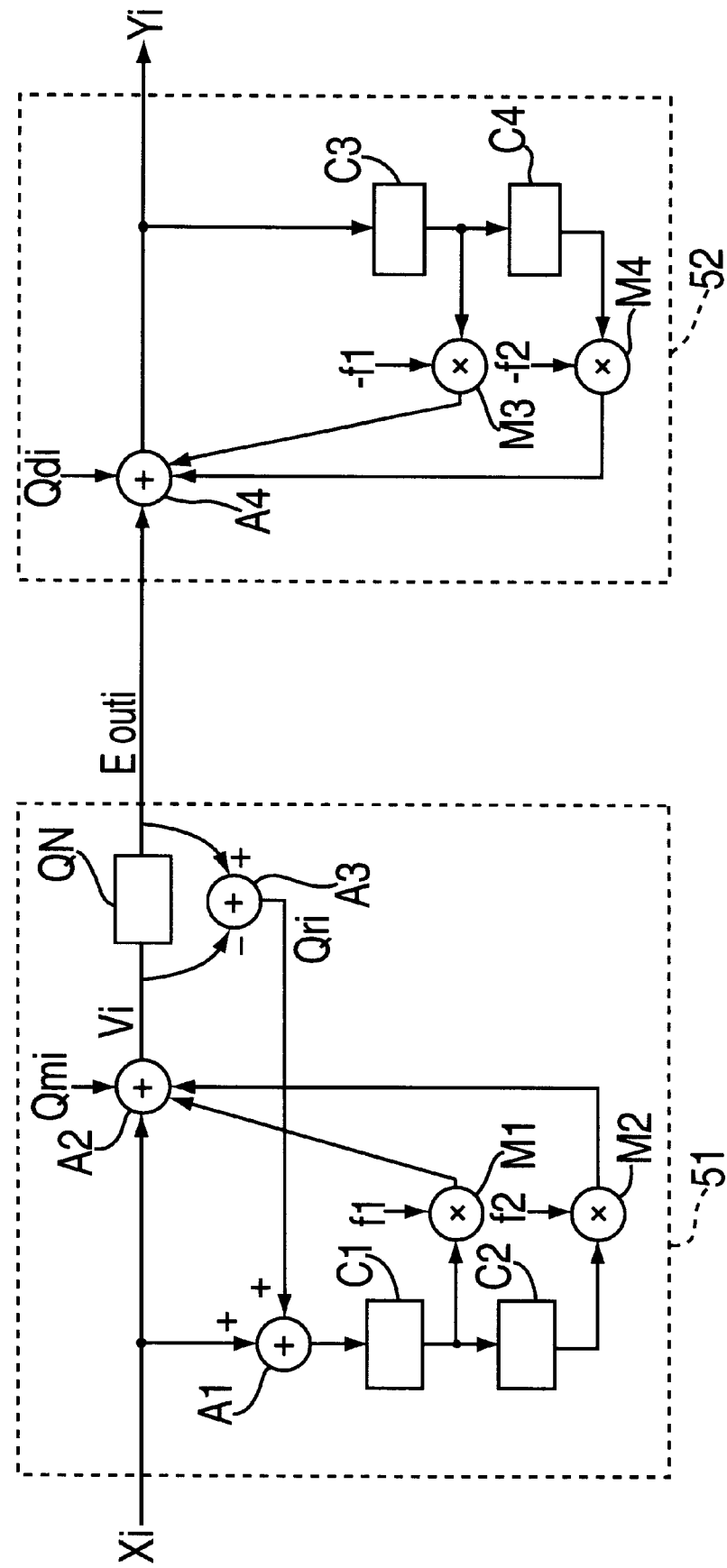
FIG. 5 is an explanatory view showing a structure of a conventional digital data processing circuit.

Referring to FIG. 1, there is shown an explanatory view for explaining a structure of a digital data processing circuit of this embodiment. In the same figure, the corresponding parts or components to those of FIG. 5 are designated by the same numeral. This is also true for the subsequent figures.

A multiplier S1 performs multiplication by −1 on output data from a quantizer QN, i.e. output data from an encoding circuit 1.

A multiplier S2 multiplies by −1 output data from a adder A4. In the structure of FIG. 5, the register C3 receives the output data from the adder A4 and the multiplier M3, M4 respectively multiply the data outputs from the registers C3, C4 by filter coefficients −f1, −f2. In this embodiment, however, a register C3 receives output data from the multiplier S2, and multipliers M3, M4 respectively multiply data outputs from the registers C3, C4 by filter coefficients f1, f2.

Now explanations will be made on operation of this embodiment.

In an encoding circuit 1, the adder A2 is inputted with i-th input data $X_i$, a product of a coefficient f1 and a sum of one-preceding input data $X_{i-1}$ and a corresponding round-off noise $Q_{ri-1}$, and a product of a coefficient f2 and a sum of two-preceding input data $X_{i-2}$ and a corresponding round-off noise $Q_{ri-2}$. These are added together, thus providing an addition output $V_i$. This addition output $V_i$ is inputted to a quantizer QN and quantized therein, thereby providing output data $E_{outi}$ from the encoding circuit 1. A round-off noise $Q_{ri}$ is obtained by subtracting an addition output $V_i$ from the output data $E_{outi}$. Also, upon multiplication by the coefficients f1, f2, a round-off noise $Q_{mi}$ occurs.

The output data $E_{outi}$ is inputted to the −1 multiplier S1 where the data is inverted in polarity, and then inputted to a decoding circuit 2.

In the decoding circuit 2, the polarity-inverted output data −Eouti is inputted to an adder A4 for IIR filtering operation. An output of the adder A4 is inputted to the multiplier S2 where it is multiplied by −1 and inverted in polarity, thus providing output data Yi from the decoding circuit 2. The data −Eouti is adder by the added A4 to a product of output data Yi-1 as one-preceding sample data and the coefficient f1, and a product of output data Yi-2 as two-preceding sample data and the coefficient f2. Here, a truncation noise Qdi occurs during multiplication with the coefficients f1, f2.

Note that the coefficients f1, f2 are in values common to the encoding circuit 1 and the decoding circuit 2.

Meanwhile, the output data Eouti from the encoding circuit 1 is expressed by Equation (1) as $$Eouti=(Xi+Qri)+f1\cdot(Xi\text{-}1+Qri\text{-}1)+f2\cdot(Xi\text{-}2+Qri\text{-}2)+Qmi \quad (1).$$

Here, Qmi is a noise truncated by the multipliers M1, M2, and express by Equation (2) as $$Qmi=[f1\cdot(Xi\text{-}1+Qri\text{-}1)+f2\cdot(Xi\text{-}2+Qri\text{-}2)]-\{f1\cdot(Xi\text{-}1+Qri\text{-}1)+f2\cdot(Xi\text{-}2+Qri\text{-}2)\} \quad (2).$$

where [X] denotes a maximum integer not greater than X. In Equation (2), [. .] means "actual multiplication outputs" by the multipliers M1, M2. Here, the "actual multiplication outputs" is obtained by truncating a least significant bit of a partial product corresponding to each bit of a coefficient and then subjected to addition. Accordingly, a truncated value depends on a bit configuration of the coefficient. Also, the following relationship stands because no truncation is made after addition for the partial product.

$$[f1\cdot X1]+[f2\cdot X2]=[f1\cdot X1+f2\cdot X2] \quad (3)$$

Now, the output data Yi of the decoding circuit can be expressed as $$Yi=-(-Eouti+f1\cdot Yi\text{-}1+f2\cdot Yi\text{-}2+Qdi)$$

$$=Eouti-(f1\cdot Yi\text{-}1+f2\cdot Yi\text{-}2+Qdi) \quad (4).$$

Here, Qdi is a truncation noise by the multipliers M3, M4 and can be expressed as $$Qdi=[f1\cdot Yi\text{-}1+f2\cdot Yi\text{-}2]-(f1\cdot Yi\text{-}1+f2\cdot Yi\text{-}2) \quad (5).$$

If substituting Equation (1) into Equation (4), we obtain $$Yi=(Xi+Qri)+f1\cdot(Xi\text{-}1+Qri\text{-}1\text{-}Yi\text{-}1)+f2\cdot(Xi\text{-}2+Qri\text{-}2\text{-}Yi\text{-}2)+Qmi-Qdi \quad (6).$$

Further, if substituting Equations (2) and (5) into Equation (6), we obtain $$Yi=(Xi+Qri)+f1\cdot(Xi\text{-}1+Qri\text{-}1\text{-}Yi\text{-}1)+f2\cdot(Xi\text{-}2+Qri\text{-}2\text{-}Yi\text{-}2)$$

$$+[f1\cdot(Xi\text{-}1+Qri\text{-}1)+f2\cdot(Xi\text{-}2+Qri\text{-}2)]+[f1\cdot Yi\text{-}1+$$

$$f2\cdot Yi\text{-}2]+\{f1\cdot(Xi\text{-}1+Qri\text{-}1)+f2\cdot(Xi\text{-}2+Qri\text{-}2)\}$$

$$+(f1\cdot Yi\text{-}1+f2\cdot Yi\text{-}2) \quad (7).$$

If applying the relationship of Equation (3) to Equation (7), we can obtain a relationship as $$Yi=(Xi+Qri)+f1\cdot(Xi\text{-}1+Qri\text{-}1\text{-}Yi\text{-}1)+f2\cdot(Xi\text{-}2+Qri\text{-}2\text{-}Yi\text{-}2)$$

$$+[f1\cdot(Xi\text{-}1+Qri\text{-}1\text{-}Yi\text{-}1)+f2\cdot(Xi\text{-}2+Qri\text{-}2\text{-}Yi\text{-}2)]$$

$$+\{f1\cdot(Xi\text{-}1+Qri\text{-}1\text{-}Yi\text{-}1)+f2\cdot(Xi\text{-}2+Qri\text{-}2\text{-}Yi\text{-}2)\} \quad (8).$$

Meanwhile, in an actual calculation, initialization is made on the encoding circuit 1 and the decoding circuit 2 at a beginning. This is equivalent to the following relationship.

$$Y1=0$$

$$Y2=0$$

$$X1=0$$

$$X2=0$$

$$Qr1=0$$

$$Qr2=0 \quad (9)$$

From Equation (9), the followings are established.

$$Y1=X1+Qr1$$

$$Y2=X2+Qr2 \quad (10)$$

Meanwhile, assumption is made as follows.

$$Yi\text{-}1=Xi\text{-}1+Qri\text{-}1$$

$$Yi\text{-}2=Xi\text{-}2+Qri\text{-}2 \quad (11)$$

If substituting the above into Equation (8), then we obtain $$Yi=(Xi+Qri)+f1\cdot(Xi\text{-}1+Qri\text{-}1\text{-}Xi\text{-}1\text{-}Qri\text{-}1)+$$

$$f2\cdot(Xi\text{-}2+Qri\text{-}2\text{-}Xi\text{-}2\text{-}Qri\text{-}2)+$$

$$[f1\cdot(Xi\text{-}1+Qri\text{-}1\text{-}Xi\text{-}1\text{-}Qri\text{-}1)+$$

$$f2\cdot(Xi\text{-}2+Qri\text{-}2\text{-}Xi\text{-}2\text{-}Qri\text{-}2)]+$$

$$\{f1\cdot(Xi\text{-}1+Qri\text{-}1\text{-}Xi\text{-}1\text{-}Qri\text{-}1)+$$

$$f2\cdot(Xi\text{-}2+Qri\text{-}2\text{-}Xi\text{-}2\text{-}Qri\text{-}2)\}$$

$$=(Xi+Qri) \quad (12).$$

From the above results, it was demonstrated that Equation (12) is valid in its relationship for all value of i, i.e., i=1, 2, 3, . . . That is, it was demonstrated that the truncation noises Qmi, Qdi are offset and removed in the digital data processing circuit of FIG. 1.

That is, since the multiplier S1 is provided in the encoding circuit 1, the decoding circuit 2 is inputted by data inverted in positive/negative sign with respect to the output of the encoding circuit 1. This causes the truncated value, i.e. truncation noise Qmi, to be inverted, resulting in compensation for the truncation noise Qdi due to the decoding circuit 2. Thus, the truncation noises Qmi, Qdi are offset. Although the result of the filtering operation by the decoding circuit 2 gives inversion in positive/negative sign with respect to the original data, the sign is returned to the original form by the multiplier S2. In this manner, the digital data processing circuit of this embodiment suppresses against degradation due to truncation noise without increasing the circuit scale.

The present invention is not limited to the structure of the digital data processing circuit shown in FIG. 1. This invention can be structured, for example, as shown in FIGS. 2, 3 and 4.

Figure 2:
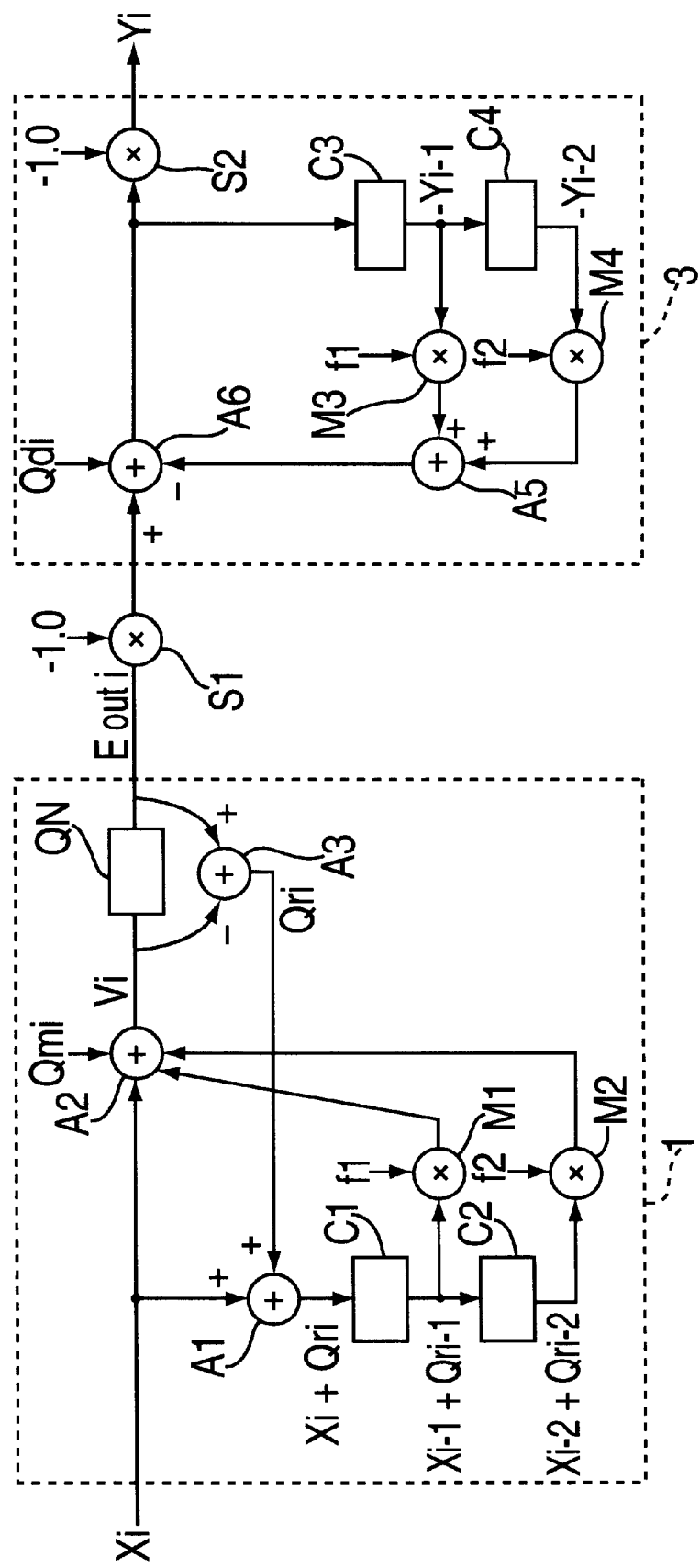
FIG. 2 is an explanatory view showing a structure of a digital data processing circuit according to a second embodiment of the present invention.

Referring to FIG. 2, a second embodiment is shown wherein a decoding circuit 3 is employed instead of the decoding circuit 2 used in FIG. 1. In the decoding circuit 3, internal-output data after subjected to filtering operation is multiplied by −1. However, recursive data −Yi-1, −Yi-2 are multiplied not by −1 but a filter-operating coefficient, and then subjected to addition by an adder A5. This added value is then subtracted from data −Eouti obtained by multiplying the output data from the decoding circuit 1 by −1. In this processing, the occurrence of truncation noise is in the multipliers M3, M4. There is coincidence between the truncation noise occurring upon inversion in positive/negative sign by a subtraction process after coefficient multiplication and the truncation noise occurring upon inversion in positive/negative sign before the multiplication. This embodiment, therefore, has the same operational effects as the structure of FIG. 1.

Figure 3:
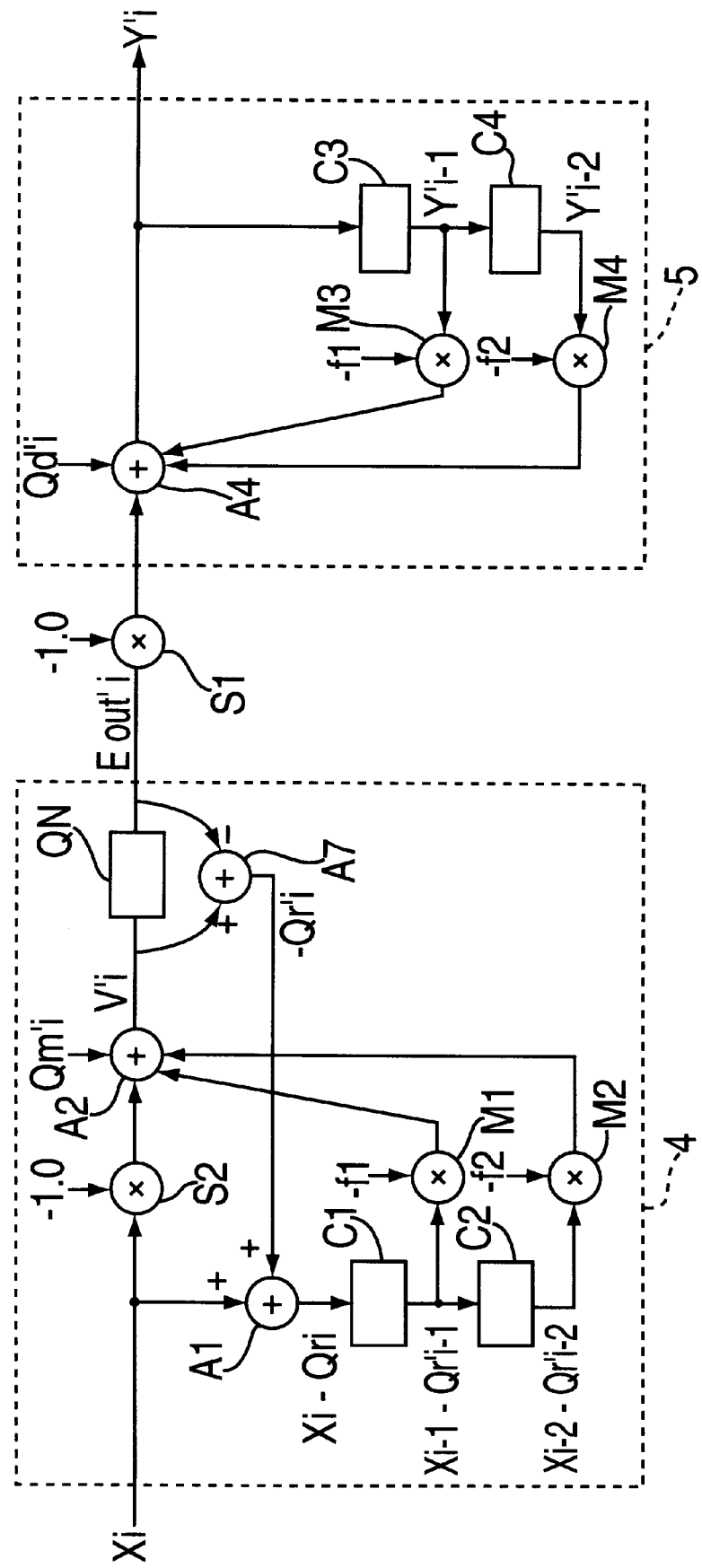
FIG. 3 is an explanatory view showing a structure of a digital data processing circuit according to a third embodiment of the present invention.

Referring to FIG. 3, a third embodiment is shown. In this embodiment, input data is previously multiplied by −1 in an encoding circuit 4 while a delay component is multiplied by a negative-sign filter coefficient. This eliminates the necessity of the positive/negative inversion of data by multiplying by −1 of output from the encoding circuit 4. A decoding circuit 5 is structured similarly to that of the conventional decoding circuit. Incidentally, as for the delay component not shown, the data previously inverted by a −1 multiplier S2 may be used without positive/negative inversion by the sign of the filter coefficient. Also, in this embodiment, since the input data Xi is inverted in sign by the encoding circuit 4, the sign for quantization noise is matched to this. Using an adder A7, output data Eout'i of a quantizer QN is subtracted from an addition output V'i of an adder A2, thereby obtaining a quantization noise −Qr'i. In also this embodiment, truncation noises Qm'i, Qd'i in a decoding circuit 5 are reverse in positive/negative sign to each other, resulting in offset. Thus, this embodiment has similar operational effects to those of the above embodiments.

Figure 4:
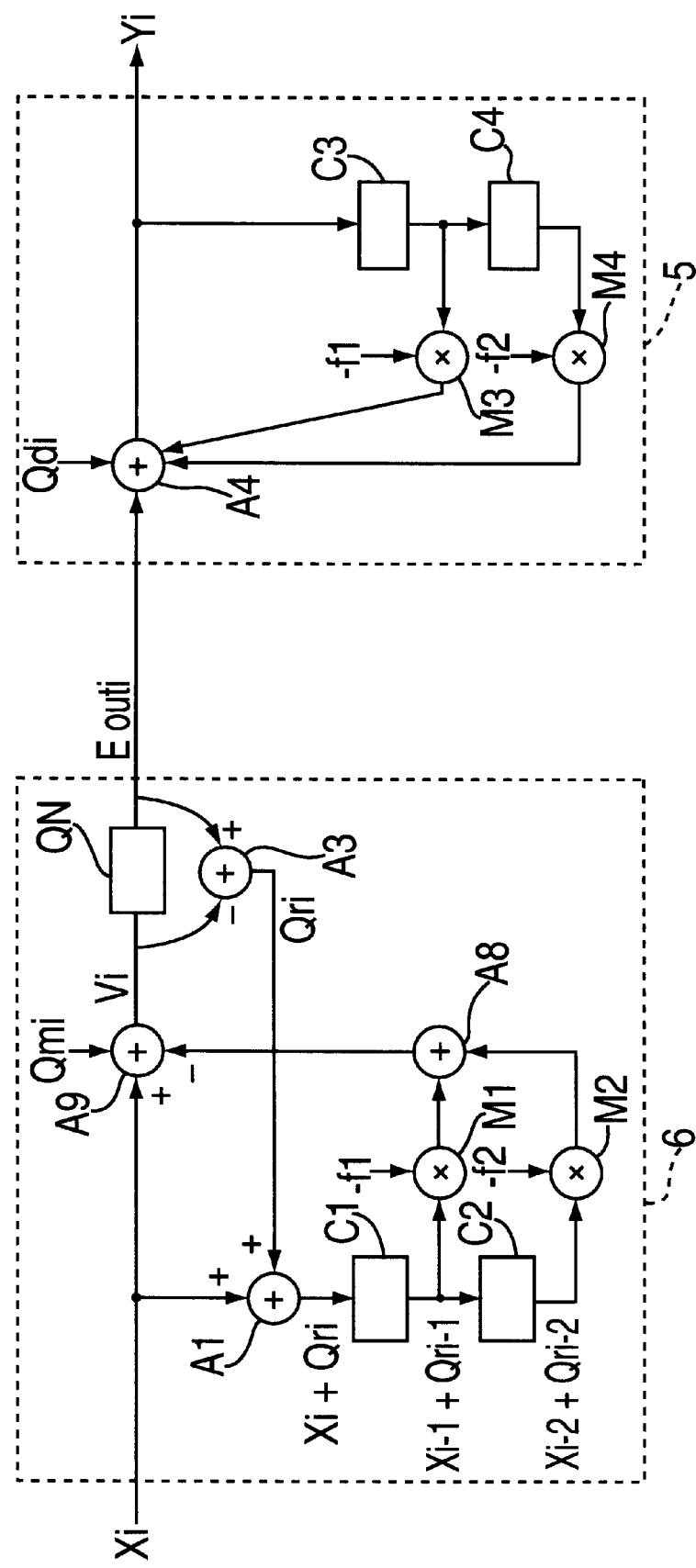
FIG. 4 is an explanatory view showing a structure of a digital data processing circuit according to a fourth embodiment of the present invention.

Referring to FIG. 4, a fourth embodiment is shown wherein an encode circuit 6 performs operations as follows. Multiplication by coefficients −f1 and −f2 are respectively made on a sum Xi-1+Qri-1 of one-preceding input data and a round-off noise and a sum Xi-2+Qri-2 of two-preceding input data and a round-off noise. These are further truncated of extra bits and then added together by an adder A8. This addition result is subtracted as a delay component from the latest input data Xi by an adder A9. That is, a truncation noise occurred upon multiplication by the coefficient −f1, −f2 is inverted in positive/negative during subtraction by the adder A9. The inverted truncation noise, while contained in output data, is outputted to a decoding circuit 5. Meanwhile, effective-bit data, rendered negative by an effect of the coefficient −f1, −f2 during a multiplication process, is returned to a positive by a subtraction process. Accordingly, there is no necessity of providing, as in the above embodiment, a −1 multiplier in the decoding circuit 5, making it possible to effecting operations as the conventional. That is, in this embodiment, the truncation noises in the encoding circuit 6 and the decoding circuit 5 only are inverted to each other. In such a case, the similar effect to the above embodiments is provided that truncation noises in the encoding circuit and the decoding circuit are offset with each other.

In the above embodiment, the filtering operation was performed by three coefficients including a coefficient for the latest input data. However, the present invention is not limited to this, but is applicable to a digital data processing apparatus using filtering operation with a coefficient of −1 for the latest input data in each of the respective encoding circuit and the decoding circuit (incidentally, although the FIG. 3 embodiment, wherein the input data is multiplied by −1, is considered as a filtering operation by a coefficient −1, it is equivalent to one with a coefficient 1 because the output data after encoding is inverted by the multiplier S1).

According to the present invention, it is possible to offset truncation noises occurred during filtering operations in the encoding circuit and the decoding circuit. The degradation of sound quality due to such truncation can be completely eliminated. Further, there is no necessity of increasing the number of bits for arithmetic operation in order to reduce such truncation noise.

What is claimed is:

1. A method for digital data processing comprising:

encoding a train of input data having a sign, employing a first filtering operation, quantization processing and addition of a quantization noise, said first filtering operation associated with first truncation noise, said first truncation noise caused by the multiplication by one or more filter coefficients;

inverting said sign of output data following encoding;

decoding said output data subjected to said encoding, employing a second filtering operation, said second filtering operation associated with second truncation noise, said second truncation noise caused by the multiplication by one or more filter coefficients; and correcting the inverted sign of the data to said original sign of the data;

whereby said first and second truncation noises caused by the respective filtering operations are offset.

2. The method of claim 1, wherein the sign of the data subjected to said decoding is corrected during said second filtering operation.

3. The method of claim 1, wherein the sign of the data subjected to said decoding is corrected after said second filtering operation.

4. The method of claim 1, wherein the sign of the output data following encoding is inverted by utilizing one or more filtering coefficients when encoding a train of data, where the value of said coefficients is inverted.

5. The method of claim 4, wherein the sign of the output data following decoding is corrected to the original sign of the data by utilizing one or more filtering coefficients when decoding a train of data, where the value of said coefficients is inverted.

6. The method of claim 5, further comprising the steps of:

correcting the sign of the train of data subjected to encoding back to the original sign of said train of data by multiplying the train of data by −1 when the data is encoded; and inverting the sign of the train of data following encoding by multiplying the result of the encoding by −1.

7. The method of claim 1, wherein the sign of the output data following decoding is corrected to the original sign of the data by utilizing one or more filtering coefficients when decoding a train of data, where the value of said coefficients is inverted.

8. A digital data processing circuit comprising:

an encoding circuit for encoding a train of input data having a sign, employing a first filtering operation, quantization processing and addition of a quantization noise, said first filtering operation associated with first truncation noise, said first truncation noise caused by the multiplication by one or more filter coefficients, wherein the sign of the output data following encoding is inverted; and a decoding circuit for decoding said output data subjected to said encoding, employing a second filtering operation, said second filtering operation associated with second truncation noise, said second truncation noise caused by the multiplication by one or more filter coefficients, wherein the sign of the data following decoding is corrected to said original sign of the data;

whereby said first and second truncation noises caused by the respective filtering operations are offset.

9. The digital data processing circuit of claim 8, wherein the sign of the data subjected to said decoding is corrected during said second filtering operation.

10. The digital data processing circuit of claim 8, wherein the sign of the data subjected to said decoding is corrected after said second filtering operation.

11. The digital data processing circuit of claim 8, wherein the sign of the output data following encoding is inverted by utilizing one or more filtering coefficients when encoding a train of data, where the value of said coefficients is inverted.

12. The digital data processing circuit of claim 11, wherein the sign of the output data following decoding is corrected to the original sign of the data by utilizing one or more filtering coefficients when decoding a train of data, where the value of said coefficients is inverted.

13. The digital data processing circuit of claim 12, wherein the sign of the train of data subjected to the encoding is corrected back to the original sign of said train of data by multiplying the train of data by −1 when the data is encoded, and the sign of the train of data following encoding is again inverted by multiplying the result of the encoding by −1.

14. The digital data processing circuit of claim 8, wherein the sign of the output data following decoding is corrected to the original sign of the data by utilizing one or more filtering coefficients when decoding a train of data, where the value of said coefficients is inverted.

* * * * *